United States Patent [19]
Piereder

[11] 3,864,891
[45] Feb. 11, 1975

[54] MEAT PACKAGING AND PRESSING APPARATUS AND METHOD

[75] Inventor: Ludwig Piereder, Pierrefonds, Quebec, Canada

[73] Assignee: A.B.R. Food Machinery (Canada) Limited, Dorval, P.Q., Canada

[22] Filed: Aug. 27, 1973

[21] Appl. No.: 391,863

[30] Foreign Application Priority Data
Sept. 1, 1973 Canada................................ 150853

[52] U.S. Cl......................... 53/35, 53/122, 53/168, 53/252
[51] Int. Cl......................... B65b 5/04, B65b 63/00
[58] Field of Search............ 53/24, 35, 122, 124 D, 53/124 TS, 168, 249, 250, 252

[56] References Cited
UNITED STATES PATENTS

| | | | |
|---|---|---|---|
| 2,337,406 | 12/1943 | Opie | 53/122 |
| 2,729,947 | 1/1956 | Cheney | 17/32 |
| 2,939,407 | 6/1960 | Keathley et al. | 17/32 X |
| 3,186,140 | 6/1965 | Bogdanovich | 53/124 D |
| 3,230,579 | 1/1966 | Johnson | 17/32 |
| 3,780,490 | 12/1973 | Schack et al. | 53/122 |

*Primary Examiner*—Robert L. Spruill
*Attorney, Agent, or Firm*—Alan Swabey; Robert E. Mitchell

[57] ABSTRACT

The invention relates to a method for packaging and pressing meat into a can or other container wherein the meat is alternately provided to one of two cavities in a sliding assembly. The cavities conform substantially to the internal shape and dimensions of the can, and meat receiving openings in vertical portions of the assembly communicate with the interior of the cavities as do meat discharging openings in horizontal portions of the assembly. The sliding assembly moves in reciprocal motion over a platform having two openings, one at either end, in the horizontal portion thereof. The openings in the platform coincide with the meat discharging openings in the assembly one at a time. Between the platform horizontal openings is an opening in a vertical portion of the platform which communicates, one at a time, with the meat receiving openings in the assembly and with a meat feeding means. The platform openings are so spaced that, when one cavity is adjacent a horizontal opening, the other is adjacent the vertical opening. The assembly is reciprocated back and forth so that the left and right hand cavities are alternately adjacent the horizontal openings. When a cavity is adjacent the vertical opening, meat is fed to that cavity. At the same time, meat is discharged from the other cavity, through its adjacent horizontal opening, into a can conveyed beneath the platform to the opening. In this way, the cavities are alternately fed and discharged, the feeding and discharging occurring simultaneously. Apparatus for carrying out the inventive method is also taught as are inventive elements of the apparatus.

4 Claims, 17 Drawing Figures

MEAT PACKAGING AND PRESSING APPARATUS AND METHOD

This invention relates to a novel process for packaging and pressing articles into a container, and to apparatus for carrying out the process. More specifically, this invention relates to a process for packaging and pressing meat into cans, and to apparatus for carrying out the process.

Although not restricted thereto, the novel process and apparatus are particularly adaptable to the packaging and pressing of processed ham into cans for distribution and selling.

The most pertinent prior art known to the applicant and having regard to the inventive process and apparatus is described in Canadian Pat. No. 858,947, issued Dec. 22, 1970, Lee R. L. Symmes, inventor. The patent teaches a meat can-packer which comprises a plurality of molds, each mold being adapted to be positioned at each of three different stations. The molds conform to the internal shape and dimensions of the cans into which the meat is to be pressed and packaged. At the first station, a can is placed over the mold. At the second station, the mold is filled with meat, and at the third station, the meat is ejected from the mold into the can while at the same time the meat is pressed into the can.

While this process and apparatus meets most requirements for meat packaging, it has the disadvantage of being a slow process in that only one operation is performed at a time.

The invention comprises a method for packaging and pressing meat into a can or other container wherein said meat is alternately provided to one of two cavities in a sliding assembly; said cavities conforming substantially to the internal shape and dimensions of said container; said sliding assembly comprising first and second meat receiving openings in vertical portions thereof; said first meat receiving opening communicating with said first cavity and said second meat receiving opening communicating with said second cavity; said sliding assembly further comprising first and second meat discharging openings in bottom horizontal portions thereof; said first meat discharging opening communicating with said first cavity and said second meat discharging opening communicating with said second cavity; said sliding assembly being adapted to move in reciprocal motion over a platform; said platform comprising an opening in a first position in a horizontal portion thereof and an opening in a second position in a further horizontal portion thereof; said first and second positions being spaced from one another; said platform further comprising an opening in a vertical portion thereof; said opening in said vertical portion being adjacent a third position in said horizontal portion; said third position being between said first and second positions; meat feeding means communicating with said opening in said vertical portion; and conveyor means for conveying a plurality of cans, one at a time, to positions beneath said platform and adjacent to said first, second and third positions of said platform; said method comprising: conveying a first can to beneath said first position and simultaneously moving said sliding assembly such that said second cavity is adjacent said second position and said first cavity is adjacent said third position, whereby said second meat discharging opening is adjacent said opening in said second position, and said first meat receiving opening is adjacent said opening in said vertical portion of said platform, the aforesaid positioning comprising a first step; feeding meat from said feeding means through said opening in said vertical portion of said platform and said first meat receiving opening to said first cavity in a second step; conveying said first can to beneath said third position and a second can to beneath said first position, and simultaneously moving said sliding assembly such that said first cavity is adjacent said first position and said second cavity is adjacent said third position whereby said first meat discharging opening is adjacent said opening in said first position, and said second meat receiving opening is adjacent said opening in said vertical portion of said platform, the aforesaid positioning comprising a third step; discharging the meat from the first cavity through the first meat discharging opening and the opening in said first position into said second can and simultaneously feeding meat from said feeding means through said opening in said vertical portion of said platform and said second meat receiving opening to said second cavity in a fourth step; conveying said first can to beneath said second position and said second can to beneath said third position and a third can to beneath said first position and simultaneously moving said sliding assembly such that said second cavity is adjacent said second position and said first cavity is adjacent said third position, whereby said second meat discharging opening is adjacent said opening in said second position, and said first meat receiving opening is adjacent said opening in said vertical portion of said platform, the aforesaid positioning comprising a fifth step; discharging the meat from the second cavity through the second meat discharging opening and the opening in said second position into said first can and simultaneously feeding meat from said feeding means through said opening in said vertical portion of said platform and said first meat receiving opening to said first cavity in a sixth step; and repeating steps three to six in sequence as often as required.

In accordance with the invention, apparatus for packaging and pressing meat into a can or other container comprises a sliding assembly comprising a first and second cavity; said assembly further comprising first and second meat receiving openings in vertical portions thereof; said first meat receiving opening communicating with said first cavity and said second meat receiving opening communicating with said second cavity; said assembly further comprising first and second meat discharging openings in bottom horizontal portions thereof; said first meat discharging opening communicating with said first cavity and said second meat discharging cavity communicating with said second cavity; said sliding assembly being adapted to move in reciprocal motion over a platform; said platform comprising an opening in a first position in a horizontal portion thereof and an opening in a second position in a further horizontal portion thereof; said first and second positions being spaced from one another; said platform further comprising an opening in a vertical portion thereof; said opening in said vertical portion being adjacent a third position in said horizontal portion; said third position being between said first and second positions; and meat feeding means communicating with said opening in said vertical portion.

The apparatus may further comprise conveyor means for conveying a plurality of cans, one at a time, to positions beneath said platform and adjacent to said first, third and second positions of said platform.

In accordance with a feature of the invention, apparatus for advancing an article in discrete steps comprises a conveyor means comprising a plurality of links; a space between each two adjacent links in said means; said links comprising an endless chain having a top and a bottom portion; means between said upper and lower portion comprising extending means adapted to extend alternately into a space in said upper portion and a space in said lower portion, and to contactingly engage respectively a link adjacent said space in said upper portion and a link adjacent said space in said lower portion; and means to provide reciprocal motion to said means between said upper and lower portions; said means for providing reciprocal motion providing motion in one direction when said extending means is in contacting engagement with the link in the upper portion; said means for providing reciprocal motion providing motion in an opposite direction when said extending means is in contacting engagement with the link in the lower portion; whereby, when the means for providing reciprocal motion provides motion in the one direction, the upper part of the chain is advanced in the one direction, and when the means for providing reciprocal motion provides motion in the other direction, the lower part of the chain is advanced in the opposite direction; said upper portion of said chain being thereby advanced in the one direction at all times.

The inventive packaging and pressing apparatus further comprises feeding means adapted to control the flow of an article therethrough, said feeding means comprising a first chamber and a second chamber; an article receiving opening in said first chamber and an article discharging opening in said second chamber; means for advancing said article from said first chamber to said second chamber in said first chamber; a first end of said first chamber opposite said article receiving opening in said first chamber and a first end in said second chamber opposite said article discharging opening in said second chamber; said first ends being adjacent one another; a stop member in said second chamber adjacent the first end thereof and abutting the first end of the first chamber; a first sleeve-like member extending from the first end of said chamber into said second chamber; said stop member airtightedly engaging said sleeve-like member over a portion of said sleeve-like member; a second sleeve-like member; said first sleeve-like member engaging said second sleeve-like member in overlapping relationship; said second sleeve-like member extending to the article discharging opening in said second chamber; and means for providing a pressure greater than atmospheric to said second chamber.

The invention will be better understood by an examination of the following description together with the accompanying drawings, in which.

Like reference numerals refer to like parts in all Figures.

Figures 1, 2:
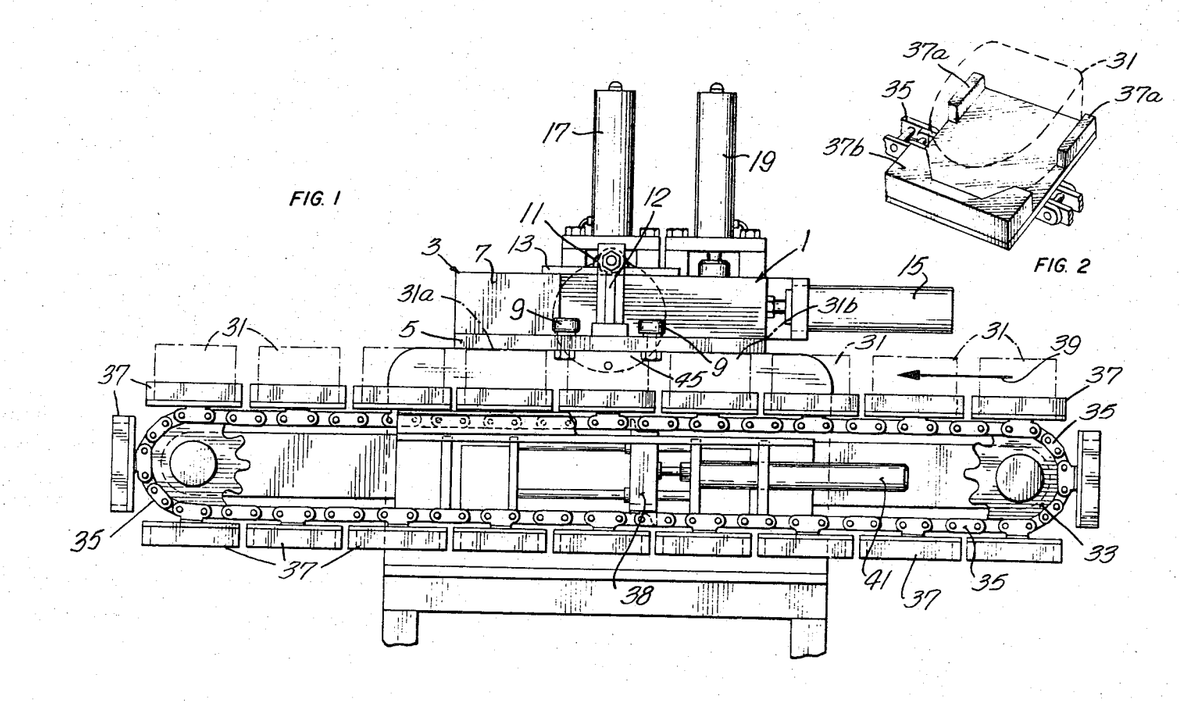
FIG. 1 is a front view of the apparatus.
FIG. 2 illustrates a can containing means in the conveyor means.
Figures 3, 4:
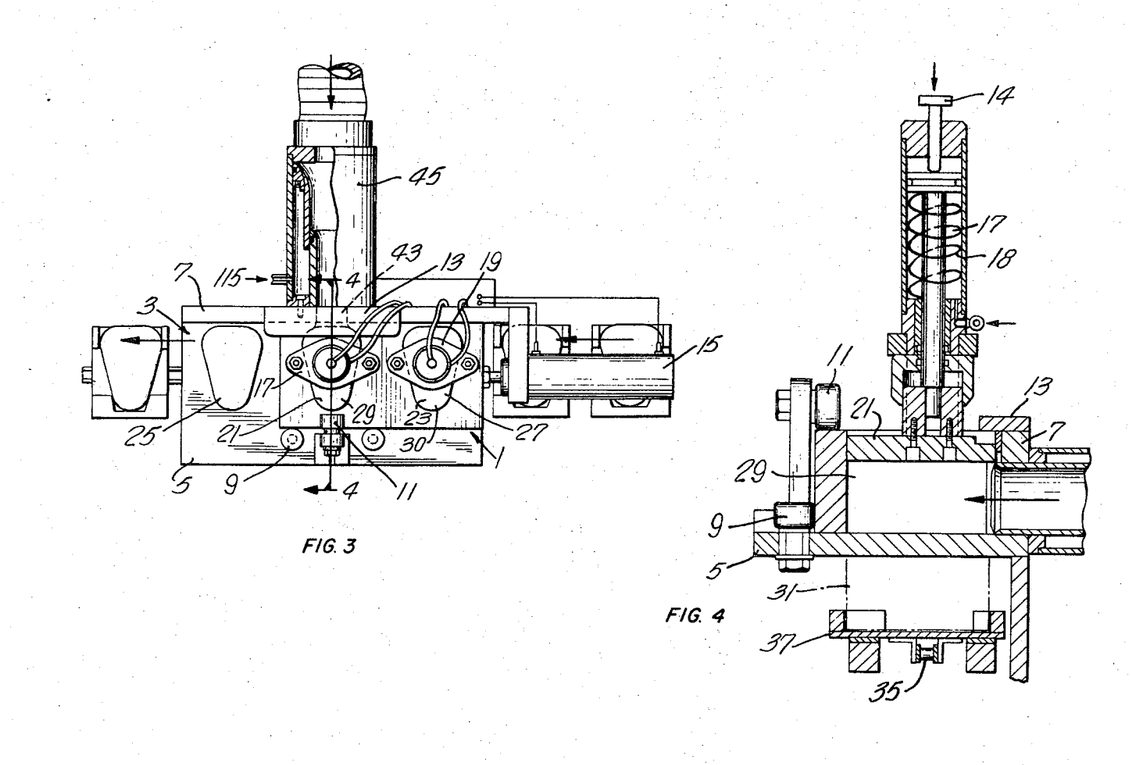
FIG. 3 is a top view of the sliding assembly and the feeding means, part of the feeding means being shown in section.
FIG. 4 is a section through the line 4—4 in FIG. 3 illustrating details of the cavity and the piston and cylinder arrangement associated with the cavity.

Referring now to FIGS. 1 and 3, 1 is a sliding assembly which is adapted to slide with reciprocal motion in the platform 3. The platform 3 comprises a horizontal portion 5 and a vertical portion 7. The slide assembly slides along rollers 9, and is held down by hold-down roller 11, supported by bracket 12 and bracket 13 (see also FIG. 4). The reciprocating motion of the sliding assembly is motivated by piston and cylinder arrangement 15, and the piston and cylinder arrangement can be activated either pneumatically or hydraulically.

The sliding assembly comprises two piston and cylinder arrangements 17 and 19 which are terminated by plates 21 and 23 respectively. The plates are shaped to conform to the top shape of the cans to be filled — as illustrated, tear-shaped cans. Each plate slides in a cavity in the slide assembly, the cavity having the same shape as the shape of the can to be filled and being of substantially the same internal dimensions of the can. Preferably, the height of the cavity is somewhat greater than the height of the can, whereas the peripheral dimensions of the top of the can are somewhat greater than the like dimensions of the cavity. One of such cavities is illustrated as 29 in FIGS. 3 and 4. Cavity 30 is directly beneath plate 23 in FIG. 3.

The cavity is made smaller and taller than the can in order to aid in the evacuation of air from the can. This evacuation is a problem in the industry. When the cavity is smaller and taller than the can, then as the meat which fills the cavity is discharged into the can, air from the can will be able to escape around the sides of the meat, as the meat is substantially the same size and shape as the cavity.

It will, of course, be necessary to provide means in the plate for allowing the air, which is coming up around the sides of the meat, to escape past the plate. Such means are illustrated in FIG. 3a, wherein A is a top view of the plate, B is a side view, and C is a plunger mechanism.

Figure 3A:
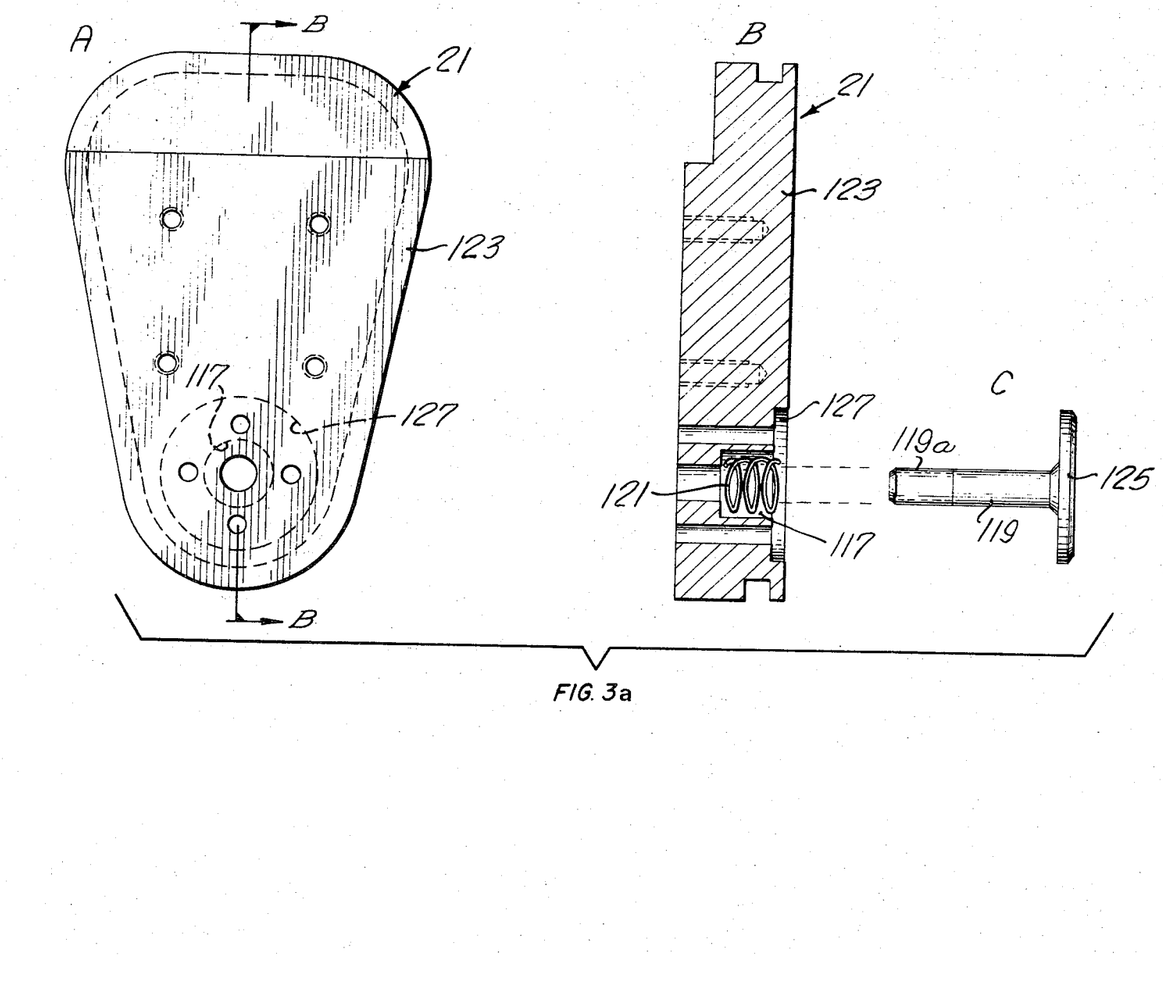
FIG. 3a illustrates, in some detail, a plate terminating a piston and cylinder arrangement.

Referring to FIG. 3a, the plunger mechanism is inserted in the through bore 117 of the plate 21 or 23. Bolt means on end 119a of plunger 119 prevent the plunger from falling out of the bore, and spring means 121 urges the plunger away from the front of the plate 123, so that an escapement passage for air exists between plunger cover 125 and the front of the plate 123 and through the through bore. When the plate presses fully on the meat, as will be explained below, the plunger cover will be forced up into the opening 127 to prevent any further air from escaping.

The volume in each cavity can be varied by screw 14. This thread presses against the top of the piston which is urged upward by spring 18. By means of this screw, the height of the plate can be varied thus varying the volume of the cavity.

The horizontal portion 5 comprises openings 25 and 27 (27 is directly beneath plate 23 in FIG. 3) which are of such a size and shape as to permit the plates 21 and 23 respectively to slide freely through them.

A conveyor 33, comprising links 35, brings cans 31 to the platform and underneath thereof to be filled. The links comprise an endless chain. Some links carry can-container means 37. As can be seen in FIG. 2, the container means comprise two side walls 37a and an end wall 37b. Cans are fed to the container means at the right hand end of the conveyor 33 and are moved by the conveyor in the direction of the arrow 39. Cans in positions 31a and 31b will be filled through openings 25 and 27 respectively. The piston and cylinder arrangement 41 serves to advance the conveyor belt as will be explained below. In addition, a further system for advancing the conveyor belt which operates only off piston and cylinder arrangement 15 will also be described.

When the sliding assembly is in the position as shown in FIGS. 1 and 3, cavity 30 is adjacent opening 27 of the horizontal portion 5. When the sliding assembly moves to the left, cavity 29 will be adjacent opening 25 in the horizontal portion 5.

Meat, or other articles, are fed to the cavities through an opening 43 in the vertical wall 7 as can be seen in FIG. 3. The meat is fed from a meat-feeding arrangement 45 which will be described in greater detail below.

Figure 11:
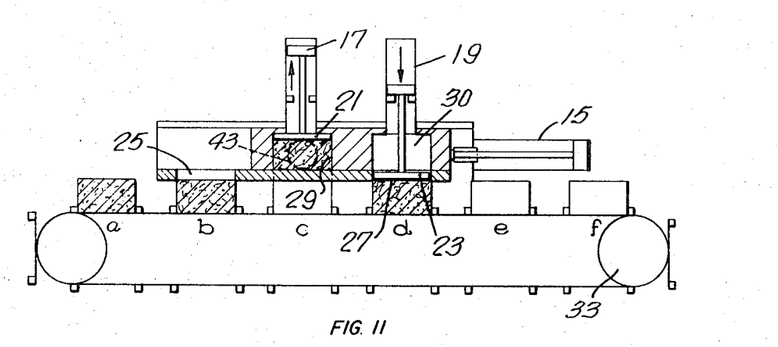
FIGS. 11 and 12 show schematically the sequence of operations of the apparatus.
Figure 12:
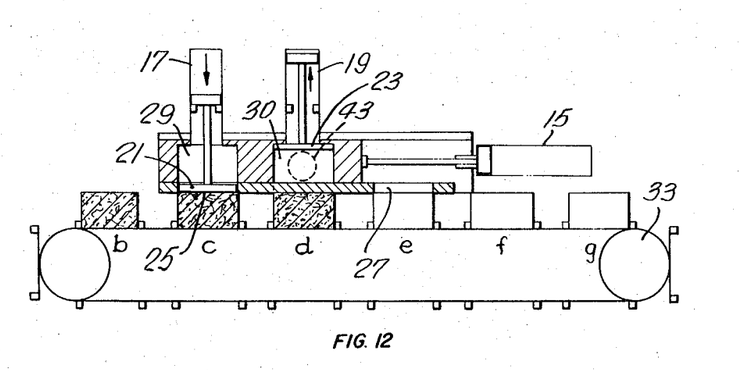

The operation of the device will be understood by an examination of FIGS. 11 and 12. In FIG. 11, cavity 29 is adjacent the opening in the vertical wall 43 and cavity 30 is adjacent opening 27 in horizontal portion 5. Cavity 29, in this position, is being filled with meat, while, simultaneously, meat which had previously been placed in cavity 30, is now being discharged and pressed into can $d$ by the action of plate 27. The conveyor is timed to remain in one position, by means well known, for a length of time sufficient for a cavity to be filled with meat or for the other cavity to completely discharge its load and for the plate to press it into the can. When these functions are complete, the conveyor will advance the cans by one position and, at the same time, the sliding assembly is moved into its other position. After this motion has taken place, the relative positions will be as illustrated in FIG. 12. In this Figure, can $c$ has been moved under opening 25. Cavity 29 is above opening 25 and is in position to discharge its load into can $c$. This discharge is aided by plate 21 of the piston and cylinder arrangement 17, and the meat is pressed into the can $c$ by the action of the piston and cylinder. At the same time, cavity 30 is adjacent the opening 43, and is filled with meat through this opening.

After the next movement, the position in FIG. 11 will be repeated, except that can $f$ will be in the position occupied by can $d$ in FIG. 11 and already filled can $d$ will be in the position occupied by can $b$ in FIG. 11. As in FIG. 11, filled cavity 30 will be adjacent opening 27 in a position to discharge its load, while cavity 29 will be adjacent opening 43 ready to be filled.

It will be apparent from the above description that the conveyor must move a distance equal to the distance between the center of the feed opening 43 and the center of either platform opening 25 or 27. In the preferred embodiment, both of the platform openings are equally spaced from the feed opening 43.

Figure 5:
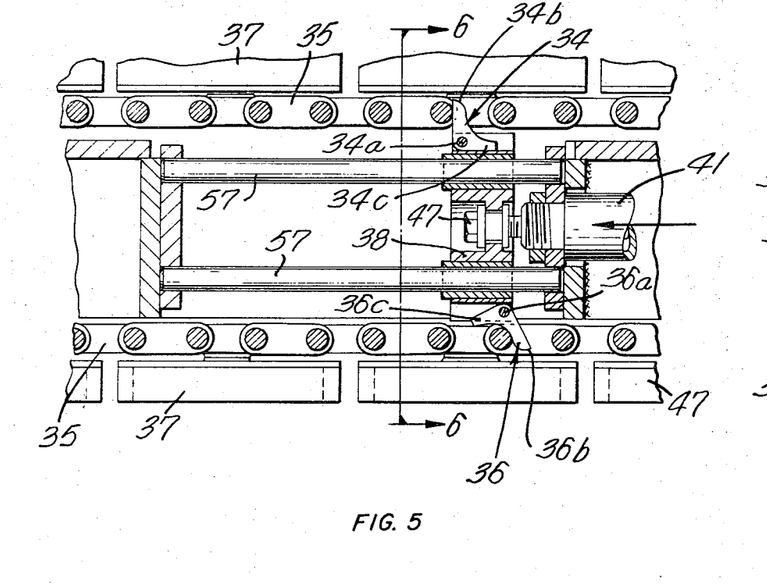
FIGS. 5 and 6 illustrate one arrangement for translating the reciprocal motion of a piston and cylinder into linear motion of the conveyor means.
Figure 6:
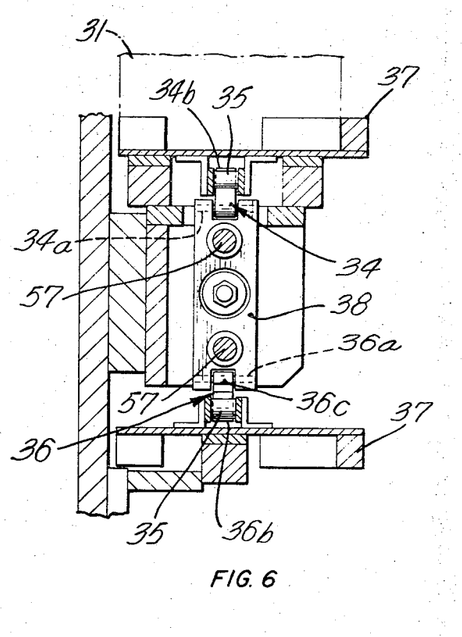

One system for advancing the conveyor is illustrated in FIGS. 5 and 6 hereof. As can be seen in these Figures, pawls 34 and 36 are carried on a pawl carrying member 38 and are respectively pivoted at 34a and 36a on the pawl carrying member. The piston and cylinder arrangement 41 is connected to the pawl carrying member by bolt 47 so that the pawl carrying member follows the piston in its reciprocating movement. Each pawl has two edges, 34b and 34c, which are adapted to abut against the end of a link 35 and one end of the pawl carrying member respectively.

The advancing mechanism operates as follows: When the piston is moving from right to left, the edge 34b of the pawl 34 abuts against the right-hand end of the link 35 on the left of the pawl. At the same time, the edge 34c is forced against the top end of the pawl carrying member 38 preventing any rotational motion of the pawl. The pawl carrying member, because of its attachment to the piston and cylinder arrangement, will move to the left with the piston. As the pawl 34 is prevented from rotating, as mentioned above, it will push against the edge of the link and force the top set of links to move to the left also. At the same time, the bottom pawl 36 is free to rotate when the pawl carrying member is moving to the left as there are no restraints on the right-hand side of the pawl. Thus, the pawl will slide over the link as shown in FIG. 5, and permit the bottom set of links to move from left to right.

When the piston and cylinder arrangement changes direction from left to right, then the bottom pawl 36 will engage the link 35 and the bottom end of the pawl carrying member 38 and force the bottom set of links to move from left to right. This motion is continued in the top set of links in a right-to-left direction. The top pawl 34 will now slide over the link 35 and permit this movement in the top set of links. Thus, it can be seen that the top set of links will move in a right-to-left direction on both the in and out strokes of the cylinder and piston arrangement 41, so that the cans will be advanced in a forward direction at all times.

It will, of course, be clear that, with this arrangement, the stroke of the piston and cylinder arrangement 41 will be equal in length to the stroke of the piston and cylinder arrangement 15 in FIG. 1. In addition, both piston and cylinder arrangements should be timed to operate at substantially the same time.

Figure 7:
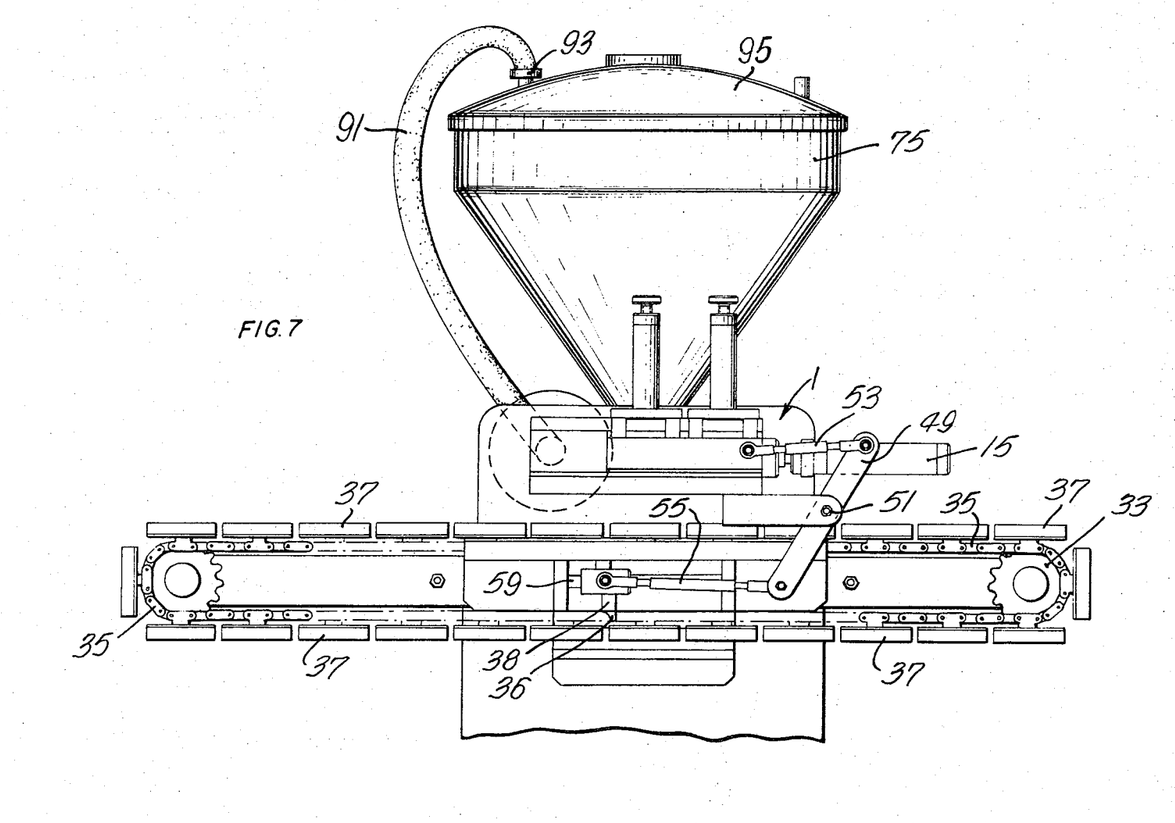
FIG. 7 illustrates a second arrangement for translating the reciprocal motion of a piston and cylinder into linear motion of the conveyor means.

FIG. 7 illustrates a mechanism for advancing the conveyor substantially as illustrated in FIG. 6 except that the FIG. 7 embodiment uses only one piston and cylinder arrangement both for advancing the conveyor belt and for reciprocating the sliding assembly. As can be seen in FIG. 7, a lever 49, adapted to pivot about point 51, is attached by rod 53 to the sliding assembly 1 at one end thereof. The other end of the lever 49 is attached, by means of the rod 55 to the pawl carrying member 38. When the piston and cylinder arrangement 15 is moving from right to left, the rod 53, which follows the motion of the sliding assembly, will also move from right to left, taking the top end of the lever 49 with it. Because of the pivotal motion, the bottom end of the lever will move from left to right, urging rod 55 and pawl carrying member 38 to move with it. Thus, it can be seen that the lever and rod arrangement will provide the reciprocating motion provided by the cylinder and piston arrangement 41 in the FIG. 6 embodiment. If the top and bottom halves of the lever are made equal, then the movement at the ends of rods 53 and 55 will be of equal length as required. In addition, because of the mechanical connection between the two rods, the timing will be automatically correctly arranged.

There is one further difference between the FIG. 6 and FIG. 7 embodiments. In FIG. 5, the pawl carrying member 38 slides along two rods 57 whereas in FIG. 7, it slides along the rod 59.

Figures 8A, 8B:
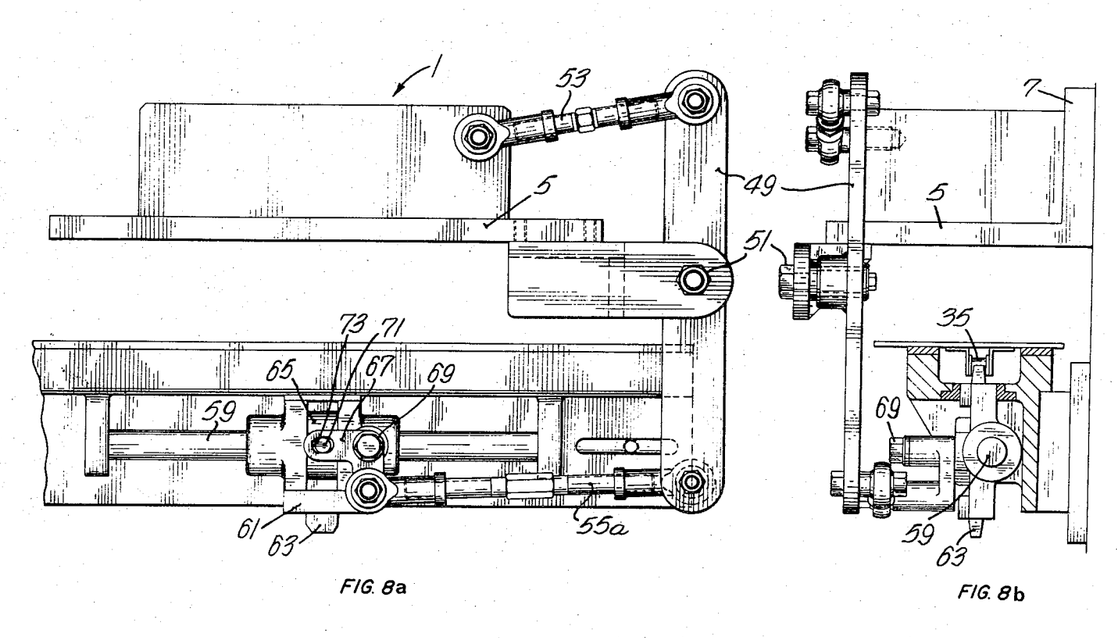
FIG. 8a illustrates a front view and FIG. 8b illustrates a side view of a third arrangement for translating the reciprocal motion of a piston and cylinder into the linear motion of a conveyor means.

In FIGS. 8a and 8b, a mechanism for advancing the conveyor belt is illustrated wherein a wedge replaces the pawls of the FIG. 6 and FIG. 7 embodiments. Referring now to these Figures, 8a is a front view and 8b a side view, the rod 53 is once again attached to the sliding assembly 1. However, the rod 55a is now attached to an L-shaped bracket 67 which is adapted to pivot about 69 on wedge carrying member 61. A wedge 63 is adapted to slide up and down in slot 65 of the wedge carrying member, and the wedge comprises a pin 71 which moves in slot 73 of the L-shaped bracket. The wedge carrying member slides on rod 59.

When the rod 55a moves from right to left, due to the action of piston and cylinder arrangement 15 moving from left to right, the vertical arm of the L-shaped bracket will rotate in a clockwise direction about the pivot 69. By a levering action, the horizontal arm of the L-shaped bracket will rotate in the same direction so that the slot 73 will first slide over the pin 71 and then lift it upwards forcing the wedge 63 upwards with it. The upwards lifting of the wedge will continue until the pin abuts the bottom-most part of the slot. At this point, upward motion is restrained, and the further movement of the rod 55a from right to left will force the wedge to move from right to left as well. As will be apparent, the wedge carrying member will slide along rod 59 following the movement of the wedge.

The wedge is arranged, when in its upmost position, to push against link 35 of the upper part of the conveyor belt, so that the upper part of the belt will also move in a right to left direction. As the lower part of the wedge does not make contact with the lower links of the belt when the wedge is in its upmost position, the lower part of the belt will simply follow the upper part of the belt.

In a like manner, when the rod 55a moves from left to right, the wedge will be forced to its lowermost position by the action of the L-shaped bracket to make contact with the bottom links on the conveyor belt. Thus, the bottom part of the belt will be forced to move from left to right, and the unrestrained upper links will continue the motion in a right-to-left direction.

As part of the stroke is used up in positioning the wedge 65 into its upper or lower position, it will be necessary for rod 55a to be longer than rod 53. Of course, the lever and rod arrangement could be replaced by a separate cylinder and piston arrangement for the wedge carrying member as per FIGS. 5 and 6. In this case, the second cylinder and piston arrangement would have a longer stroke than the piston and cylinder arrangement 15.

Figure 9:
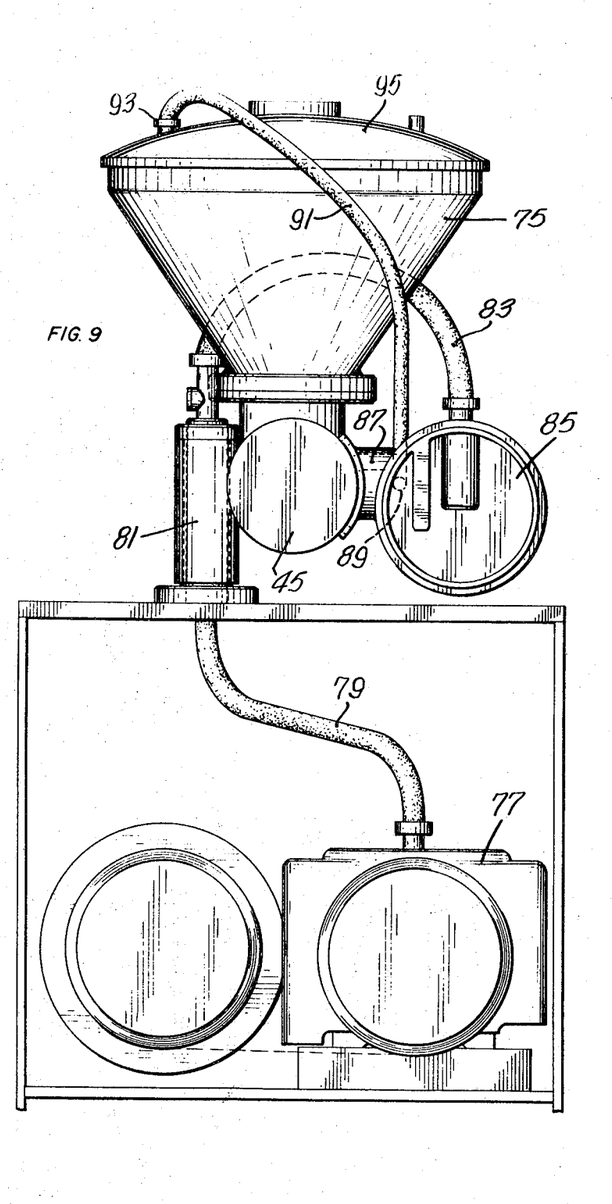
FIG. 9 is a view from the rear of the apparatus to illustrate the circuit for providing reduced pressure in the feeding means.
Figure 10:
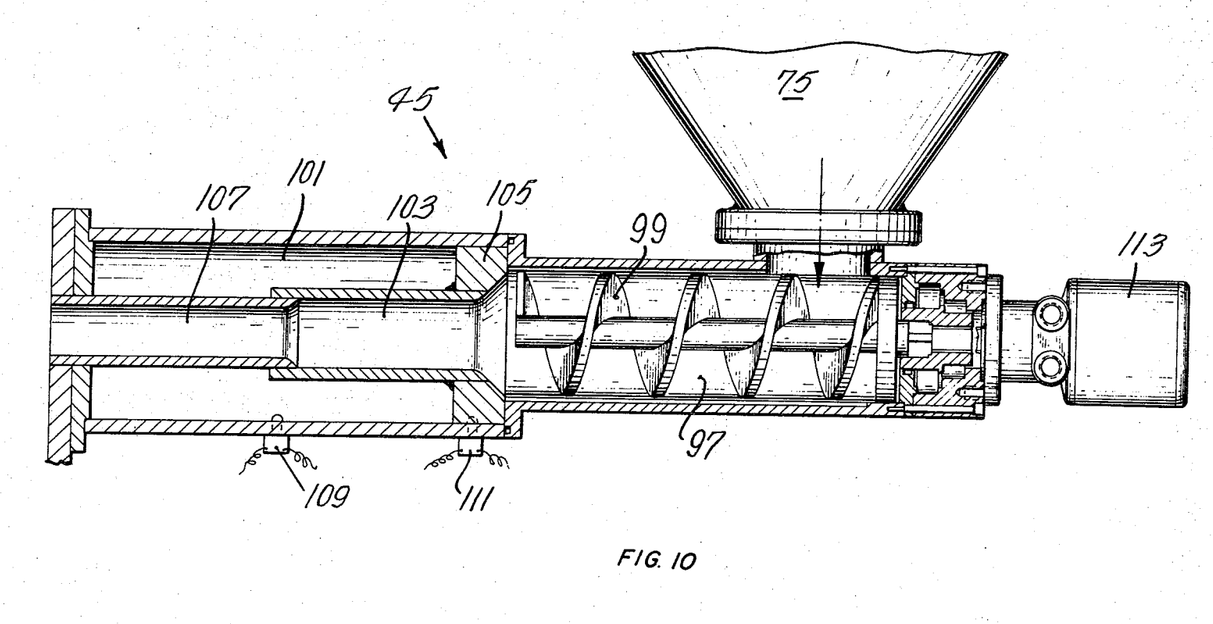
FIG. 10 illustrates in greater detail means for controlling the flow of meat through the feeding means.

Meat is fed to the meat feeding arrangement 45 through a hopper 75 shown in FIGS. 7, 9 and 10. Pressure in both the hopper and the feeder may be reduced in order to assist the force of gravity in pulling the meat down into the feeder. A circuit for reducing the pressure is illustrated in FIG. 9. FIG. 9 shows the apparatus as seen from the rear. A vacuum pump 77 is connected by a hose 79, through-bore 81 and further hose 83 to a means for controlling the extent of the vacuum 85. This means may be a water separator as well known in the art. The separator 85 is connected to the feed means 45 through a channel 87 which is aligned with openings in both the separator and the feed means. A further opening 89 in the separator 85 is connected by hose 91 to opening 93 in the hopper 75 as can also be seen in FIG. 7. The hopper 75 is airtightedly covered by cover 95.

As will be apparent, the circuit thus shown will draw a vacuum and reduce the pressure in both the meat feeder and the hopper.

According to another feature of the inventive apparatus, the feed means 45 comprises means for controlling the flow of meat therethrough. It is necessary that the feeder be kept continually full so that it will be able to provide meat to cavities 29 and 30 as soon as these cavities are presented to the feeder. Attempting this by having the flow of meat equal to the rate at which the meat is disposed of is not practical as the meat flows continuously whereas it is disposed of, to the cavities, in discrete steps. However, even if both flows were continuous, physical realities would prevent accurate equalization of the flows.

If the meat feeder is not kept continuously full, there is the danger that the cans will not be filled completely with the required weight of meat. However, providing the meat at a rate greater than its rate of disposal could lead to machine breakdowns in the absence of controls.

Applicant's inventive control means are illustrated in FIG. 10. In FIG. 10, the feed means 45 comprises a first chamber 97 with a screw thread 99. The screw thread is driven by the motor 113. A second chamber 101 comprises a first cylinder 103 with an end member 105. The first cylinder is adapted to slide in sleeve-like engagement over a second cylinder 107. It is, of course, obvious that the cylinders 103 and 107 could be rectangular or otherwise shaped. However, a cylindrical shape is the most practical. Switch means 109 and 111 are located at the middle and the right-hand end respectively of the second chamber.

The second chamber is pressurized at a pressure above atmospheric, say 40 psi. Thus, the pressure will act on the stop member 105 to retain it against the right-hand wall of the second chamber. The screw thread is adapted to turn at such a rate as to provide a flow of meat which is greater than the rate at which the meat is disposed of.

In operation, the control works as follows: Initially, all elements are in the positions illustrated in FIG. 10. As the screw thread turns, meat is forced through cylinders 103 and 107. As the meat is provided faster than it is disposed of, eventually both cylinders will be full. As the screw thread provides more meat, it will act with a force on the right-hand side of member 105 great enough to overcome the pressure in the second chamber so that member 105 will begin to move to the left and cylinder 103 will slide over cylinder 107. In order to avoid the build-up of excesive pressure during this time, the second chamber is connected, through an opening 115 (see FIG. 3) to an air box (not shown) so that the pressure in the chamber remains constantly at its pre-assigned value.

The force of the continuing meat supply from the screw thread will finally move member 105 far enough to the left so that it will actuate switch 109. Actuation of this switch causes the motor 113 to stop so that the screw thread will no longer rotate and meat will cease being provided to the second chamber. This release of the leftward force will permit the higher pressure in the left-hand side of the chamber to force the member 105 back to the right. As the member 105 is forced rightward, it will continue to push meat through the cylinders 103 and 105 which will be disposed of in the normal operation of the apparatus.

The rightward movement of the member 105 will continue until it actuates switch means 111. This will again turn on motor 113 and start the screw thread turning to begin a new cycle.

It can be seen that, with this means, meat will be continuously provided to the cavities while overloading and breakdowns will be prevented.

It will, of course, be appreciated that the screw thread could be replaced by other means for advancing the meat in the first chamber.

In accordance with a further embodiment, articles, such as meat, can be fed to the cavities 29 and 30 by a valve and cylinders arrangement comprising a valve and two cylinders. Openings are provided in the valve, and means for communicating with the cylinders through the openings are also provided. By means of the valve, each cylinder is alternately connected to a source of meat or other articles, e.g., hopper 75, the other cylinder being connected to the opening 43 in the vertical wall 7. When a cylinder is connected with the source of meat, it is being filled with meat, while, at the same time, the other cylinder, connected with the opening 45, is emptying its contents into the cavities 29 or 30.

The interior volume of each cylinder is substantially larger than the volume of a can to be filled and can include enough articles to fill up to, for example, 50 cans. Operation with this embodiment is continuous, as, while one cylinder is being filled, the other is, simultaneously, being emptied. Thus, there is no need for a time lag.

Figure 13:
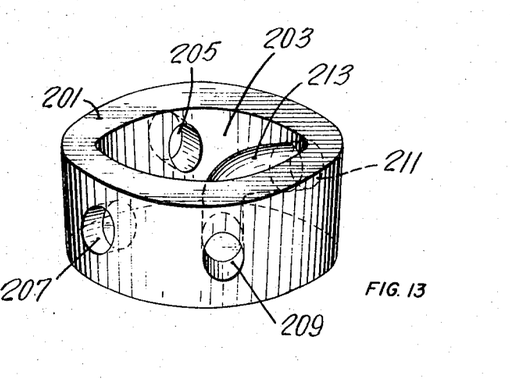
FIG. 13 is a perspective view of a valve used in a second feed arrangement.

Referring now to FIG. 13, the valve, indicated generally at 201, comprises an empty cylinder having a top opening 203. Side openings, 205, 207, 209 and 211, are spaced 90° apart on the side wall of the cylinder, and openings 209 and 211 are connected by a pipe-like member 213. As a result of the pipe-like member, the openings 209 and 211 are not in communication with the interior of the cylinder. Openings 205 and 207, on the other hand, do communicate with the interior of the cylinder. The bottom of the cylinder 201 is closed off so that the bottom of the cylinder together with the side wall define an interior chamber.

The openings 205 and 207 comprise charging ports for article storage cylinders, which will be discussed below, and the openings 209 and 211 comprise article discharge ports for the same cylinders.

Figure 14:
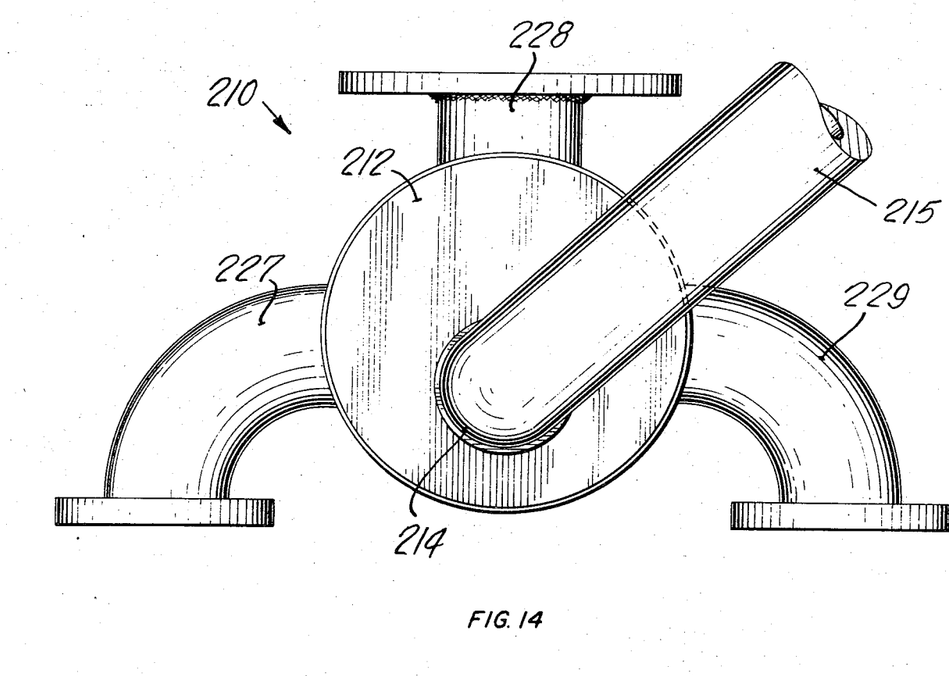
FIG. 14 is a top view of the valve of FIG. 13 in a valve housing.

The valve is rotatably mounted in a valve housing 210 shown in FIG. 14. The housing includes an empty cylindrical portion 212 and pipe-like members 227, 228 and 229. As can be seen, the pipes communicate with the interior of the hollow cylinder 212. As will be seen in FIG. 15, the pipes 227 and 229 are connected to the cylinders so that the interior of the cylinders will communicate with the interior of hollow cylinder 212, while pipe 228 comprises a material discharge means for the cylinder and valve arrangement and communicates with opening 45 in vertical wall 7.

Hose 215 is connected to top opening 214 of the housing 210. The other end of the hose is connected to a source of material, e.g., the hopper 75 illustrated in FIGS. 7, 9 and 10.

Figure 15:
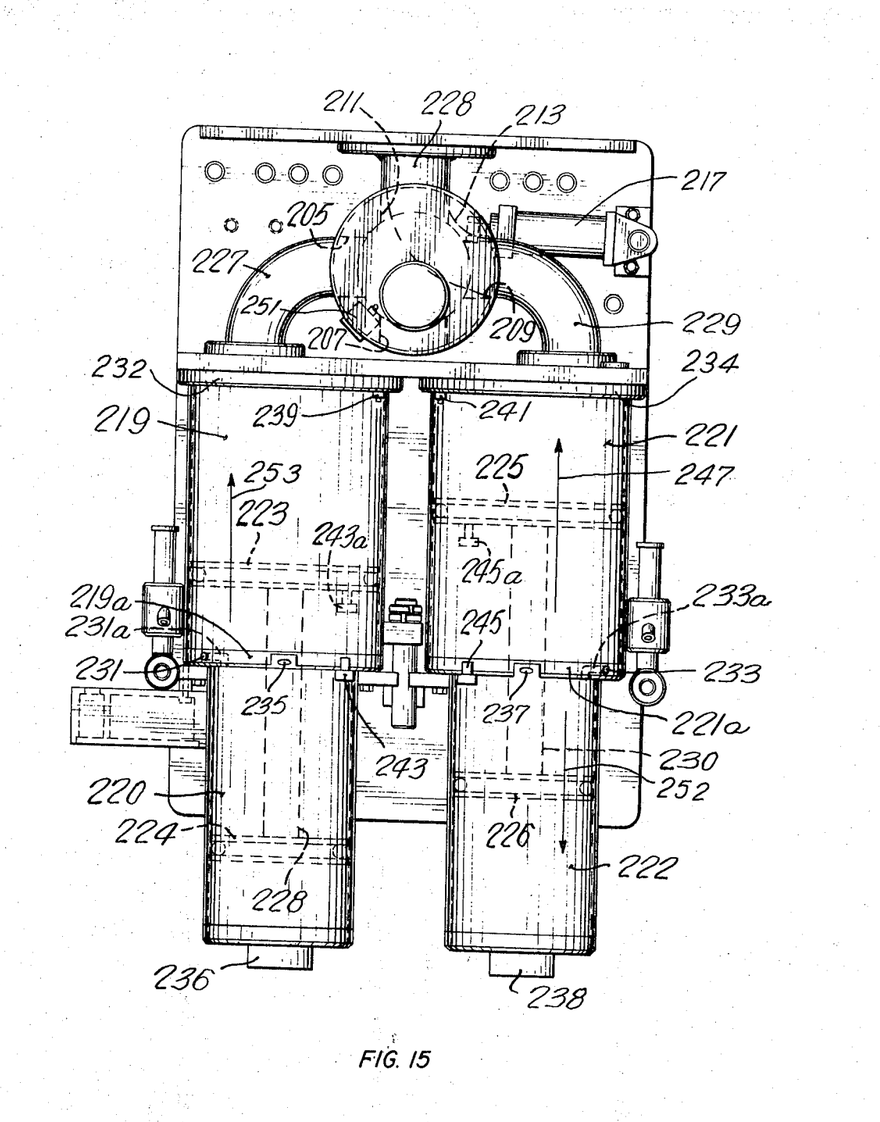
FIG. 15 is a top view of the second feed arrangement comprising the valve and two cylinders.

Referring now to FIG. 15, the cylinders and valve arrangement comprises rotating means 217 for rotating the valve 201 in the housing 210 as will be discussed below. The arrangement further comprises article storage and dispensing cylinders 219, 221, disposed in side by side arrangement adjacent the valve 201. Each cylinder 219, 221 comprises an associated air cylinder 220 and 222 respectively. Disposed in cylinder 219 is a piston 223, and disposed in associated air cylinder 220 is piston 224. Pistons 223 and 224 are connected by rod 228 so that both pistons will move together. In a like manner, piston 225 of cylinder 221 is connected to piston 226 of cylinder 222 by rod 230 for joint movement. The interior of cylinder 219 communicates with valve 201 by means of pipe 227 through opening 232 in 219 and the interior of cylinder 221 communicates with the valve by means of pipe 229 through opening 234 in 221.

Flanges 219a and 221a of cylinders 219 and 221 also comprise inlets 231 and 233 with associated channels 231a and 233a for the introduction of pressurized air into air cylinders 220 and 222 respectively at the top ends thereof. Vacuum connections 235 and 237 are provided at the bottom end of cylinders 219 and 221 for pulling a vacuum therein. Cycle starting switches 239, 241 are provided at the end of each cylinder 219, 221 respectively closest the valve, and vacuum switches 243, 245 are provided at the other end of the cylinders. Extension means 243a and 245a are mounted on pistons 223 and 225 respectively to activate the respective switches 243 and 245. 243a and 245a can be screws so that their lengths are easily adjustable. The switches can comprise electronic switches or multi-way hydraulic valves, or other means for actuating a sequence of events as is well known in the art. Inlets 236 and 238 are provided at the bottom ends of cylinders 220 and 222 respectively for the introduction of pressurized air into these cylinders.

The valve is rotatable in the housing in such a manner that, in one position, opening 211 is adjacent 228 and opening 209 is adjacent 229 so that the interior of cylinder 221 communicates with opening 43. At the same time, opening 205 is adjacent 227 so that the interior chamber of the valve communicates with the interior of cylinder 221. Opening 205 is adjacent the wall of housing 212 so that it is blocked.

In a second position, 209 is adjacent 228 and 211 is adjacent 227 so that the interior of cylinder 219 communicates with opening 43. At the same time, 207 is adjacent 229, so that the interior chamber of the valve communicates with the interior of cylinder 221. Opening 205 is blocked by the valve housing wall.

In operation, the cylinders and valve arrangement works as follows: With the valve in the position as shown, i.e., with discharge port 209 adjacent pipe 229 and discharge port 211 adjacent opening 43, and discharge port 205 adjacent opening 43, meat will be charging from the cylinder 221 to the cavities 29 or 30 flowing the opening 43 as shown by arrow 247. At the same time, meat will be flowing, from the source, through hose 215 and opening 203, to the interior chamber of the valve and thence, out through port 205, through pipe 227 to the cylinder 219.

At this time, a source of pressurized air is connected to inlet 238 to force piston 226, and thus also piston 225, to move in the direction of arrow 247, dispensing the contents of the cylinder via pipes 229 and 213 and through opening 43 into the cavities 29 or 30 to be inserted into cans as above described.

At the same time, cylinder 219 is connected to a vacuum by means of connection 235. The piston 223 is adjacent the back end of the cylinder 219 and, at the front end, the interior of the cylinder 219 communicates with the interior chamber of the valve via pipe 227 and opening 205. As hose 215 is connected to a source of meat, and as cylinder 219 is connected to a vacuum source, the meat from the source will be sucked into the cylinder 219 through the hose, the interior of the valve, opening 205 and pipe 227.

When piston 225 reaches the front end of cylinder 221, it will actuate switch 241 which will set the following sequence of events in motion:
— piston 225 will stop moving
— the canning operation will be stopped
— pressurized air is applied to opening 233 to start piston 226, and therefore also piston 225, moving in the direction of arrow 252
— means 217 will rotate the valve 201 until port 211 is adjacent pipe 227 and port 209 is adjacent the opening 43. When the valve reaches this position, it will actuate switch means 251 which will control means to apply pressurized air to opening 236 of cylinder 220 to start piston 224, and therefore also piston 223 moving in the forward direction of arrow 253.

While piston 223 was against the back end of the cylinder 219, extension means 243a engaged switch 243 to permit a vacuum to be pulled in cylinder 219; when piston 223 moves in the direction 253, after a time, the switch 243 is disengaged to shut off the vacuum in cylinder 219.

Meanwhile, piston 225 is moved to the rear of cylinder 221. When extension 245a engages switch 245, a vacuum will be applied to cylinder 221 so that meat will be sucked into this cylinder.

When piston 223 reaches the front end of cylinder 219 and actuates switch 239, it will initiate a sequence identical to the sequence above described except for the reversal of cylinders. It will, of course, be clear that both the cylinders and their peripheral equipment are alike in their operating features.

It will also be clear that it would be possible, within the scope of the invention, to have different actuating sequences. Thus, any event could actuate a switch which would initiate the following event. Or, one switch could initiate several events. Further, specific means for rotating the cylinder, or applying pressurized air to openings on command, or applying a vacuum to the cylinder, are well known in the art and do not require any further description here. It is only necessary to provide a valve and cylinders arranged so interrelated and controlled that, while one of the cylinders is being filled with meat, the other is dispensing its contents to the cavities.

Although several embodiments have been described above, this was for the purpose of illustrating, but not limiting, the invention. Various modifications which will come readily to the mind of one skilled in the art are within the scope of the invention as defined in the appended claims. I claim:

1. A method for packaging and pressing meat into a can or other container wherein said meat is alternately provided to one of two cavities in a sliding assembly;
  said cavities conforming substantially to the internal shape and dimensions of said container;
  said sliding assembly comprising first and second meat receiving openings in vertical portions thereof;
  said first meat receiving opening communicating with said first cavity and said second meat receiving opening communicating with said second cavity;
  asaid sliding assembly further comprising first and second meat discharging openings in bottom horizontal portions thereof;
  said first meat discharging opening communicating with said first cavity and said second meat discharging opening communicating with said second cavity;
  said sliding assembly being adapted to move in reciprocal motion over a platform;
  said platform comprising an opening in a first position in a horizontal portion thereof and an opening in a second position in a further horizontal portion thereof;
  said first and second positions being spaced from one another;
  said platform further comprising an opening in a vertical portion thereof;
  said opening in said vertical portion being adjacent a third position in said horizontal portion;
  said third position being between said first and second positions;
  meat feeding means communicating with said opening in said vertical portion;
  and conveyor means for conveying a plurality of cans, one at a time, to positions beneath said platform and adjacent to said first, second and third positions of said platform;
  said method comprising:
  conveying a first can to beneath said first position, simultaneously moving said sliding assembly such that said second cavity is adjacent said second position and said first cavity is adjacent said third position, whereby said second meat discharging opening is adjacent said opening in said second position, and said first meat receiving opening is adjacent said opening in said vertical portion of said platform, the aforesaid positioning comprising a first step;
  feeding meat from said feeding means through said opening in said vertical portion of said platform and said first meat receiving opening to said first cavity in a second step;
  conveying said first can to beneath said third position and a second can to beneath said first position, and simultaneously moving said sliding assembly such that said first cavity is adjacent said first position and said second cavity is adjacent said third position whereby said first meat discharging opening is adjacent said opening in said first position, and said second meat receiving opening is adjacent said opening in said vertical portion of said platform, the aforesaid positioning comprising a third step;

discharging the meat from the first cavity through the first meat discharging opening and the opening in said first position into said second can and simultaneously feeding meat from said feeding means through said opening in said vertical portion of said platform and said second meat receiving opening to said second cavity in a fourth step;

conveying said first can to beneath said second position and said second can to beneath said third position and a third can to beneath said first position and simultaneously moving said sliding assembly such that said second cavity is adjacent said second position and said first cavity is adjacent said third position, whereby said second meat discharging opening is adjacent said opening in said second position, and said first meat receiving opening is adjacent said opening in said vertical portion of said platform, the aforesaid positioning comprising a fifth step;

discharging the meat from the second cavity through the second meat discharging opening and the opening in said second position into said first can and simultaneously feeding meat from said feeding means through said opening in said vertical portion of said platform and said first meat receiving opening to said first cavity in a sixth step;

and repeating steps three to six in sequence as often as required.

2. Apparatus for packaging and pressing meat into a can or other container comprising:

a sliding assembly comprising a first and second cavity;

means for supporting cans to be filled beneath said cavities;

said assembly further comprising first and second meat receiving openings in vertical portions thereof;

said first meat receiving opening communicating with said first cavity and said second meat receiving opening communicating with said second cavity;

said assembly further comprising first and second meat discharging openings in bottom horizontal portions thereof;

said first meat discharging opening communicating with said first cavity and said second meat discharging cavity communicating with said second cavity;

means for positively discharging meat through said first and second meat discharging openings into cans to be filled;

said sliding assembly being adapted to move in reciprocal motion over a platform;

said platform comprising an opening in a first position in a horizontal portion thereof and an opening in a second position in a further horizontal portion thereof;

said first and second positions being spaced from one another;

said platform further comprising an opening in a vertical portion thereof;

said opening in said vertical portion being adjacent a third position in said horizontal portion;

said third position being between said first and second positions; and meat feeding means communicating with said opening in said vertical portion.

3. Apparatus as defined in claim 2, and further comprising conveyor means for conveying a plurality of cans, one at a time, to positions beneath said platform and adjacent to said first, third and second positions of said platform.

4. Apparatus as defined in claim 2, wherein said meat feeding means comprises:

valve means comprising a hollow cylinder having a top end and a bottom end, and an enclosing side wall having a circular cross section, said bottom end being closed, said bottom end and enclosing side wall defining an interior chamber of said hollow cylinder;

four ports in said side wall spaced at 90° intervals on the circumference of said side wall;

two adjacent ones of said four ports comprising charging ports and the remaining two adjacent ports comprising discharging ports;

pipe means within said chamber connecting said discharging ports;

whereby said charging ports communicate with said chamber and said discharge ports do not communicate with said discharge chamber;

means for rotating said valve means such that, in one position thereof, one of said discharge ports is adjacent said opening in said vertical portion, and, in a second position thereof, the second of said discharge ports is adjacent said opening in said vertical portion;

said meat feeding means further comprising a first and a second storage and discharge cylinder; and first and second means communicating the interior of said first and second storage and discharge cylinders respectively with said valve means;

each said storage and discharge cylinders comprising means for discharging meat from the interior thereof and means for drawing meat into the interior thereof; and means for supplying meat to the top end of said hollow cylinder;

said first and second storage and discharge cylinders being respectively so disposed relative to said first and second means for communicating the interior of said first and second storage and discharge cylinders with said valve means that;

when said valve means is in said first position, the interior of said first storage and discharge cylinder communicates, via said first means for communicating the interior of said first storage and discharge cylinder with said valve means and said pipe means within said chamber, with said opening in said vertical portion, and the interior of said second storage and discharge cylinder communicates, via said second means for communicating the interior of said second storage and discharge cylinder, with said chamber; and when said valve means is in said second position, the interior of said second storage and discharge cylinder communicates, via said second means for communicating the interior of said second storage and discharge cylinder with said valve means and said pipe means within said chamber, with said opening in said vertical portion, and the interior of said first storage and discharge cylinder communicates, via said first means for communicating the interior of said first storage and discharge cylinder with said valve means, with said chamber;

control means;

to actuate said means for discharging meat in said first storage and discharge cylinder and means for drawing meat into said second storage cylinder when said valve means is in said first position, whereby meat in said first storage and discharge cylinder is discharged from said first storage and discharge cylinder whereas meat is supplied to said second storage and discharge cylinder when said valve means is in said first position; and to actuate said means for discharging meat in said second storage and discharge cylinder and means for drawing meat into said first storage and discharge cylinder when said valve means is in said second position, whereby, meat in said second storage and discharge cylinder is discharged from said second storage and discharge cylinder and meat is drawn into said first storage and discharge cylinder when said valve means is in said second position;

and further control means actuating said means for rotating said valve to rotate said valve to another position when substantially all of the meat in an appropriate storage and discharge cylinder has been discharged.

* * * * *